United States Patent Office 2,981,755
Patented Apr. 25, 1961

2,981,755
UNSATURATED HALOGENATED CYCLOPENTENE COMPOUNDS

Herbert K. Wiese, Cranford, N.J., assignor to Esso Research and Engineering Company, a corporation of Delaware No Drawing. Filed Dec. 3, 1958, Ser. No. 777,829

11 Claims. (Cl. 260—648)

This invention relates to novel cyclo-alkenyl halo-alkanes and a method for its preparation. More specifically this invention relates to the preparation of a halo-alkane substituted cyclo-olefin by the reaction of a halo substituted cyclo-olefin with an aliphatic olefin in the presence of a Friedel-Crafts type catalyst.

It is well known in the art that saturated hydrocarbons may be made to condense with chlorinated olefins in the presence of a catalyst to produce chloro-alkanes. It is also known that chloro-alkanes will condense with olefins to produce chloro-alkanes. It is further known that halogenated alkanes such as chlorocyclopentane may be reacted with halogenated olefins such as vinyl chloride to produce polyhalogenated derivatives such as dichloro-ethyl cyclopentane. In all of the above reactions the final product is a saturated chloro-alkane either acyclic or cyclic in nature depending on the feed reactants employed.

It has now been discovered that a halo-alkane substituted cyclopentene containing a double bond in the ring structure may be produced in good yields by the reaction of the appropriate halocycloalkene and an olefin.

The novel compounds of this invention are typified by the following structural formula:

wherein R represents a halogenated alkyl radical having from 2–20 carbon atoms. R' and R" represent hydrogen or $C_1$–$C_3$ alkyl radicals such as methyl, ethyl and the like attached to the ring. In the reaction of this invention the double bond in the halocyclopentene feed remains intact and does not enter into the reaction.

The products obtained herein are extremely useful as chemical intermediates for the preparation of valuable oxygenated compounds. The products are also useful as agricultural chemicals. Chloro-isobutyl cyclopentene is in itself useful as a nematocide or soil fumigant.

As the halocyclopentene, there may be employed the simple halogenated cyclopentene such as 3 or 4-chloro-cyclopentene. The term "cyclopentene" includes mono or dialkyl substituted derivatives of these chloropentenes. The alkyl substituent preferably should be less than 8 carbon atoms, e.g., methyl, ethyl, propyl, butyl, pentyl, etc. A typical alkyl substituted chloropentene comprises 3-chloro-4-ethylcyclopentene. Obviously other alkyl groups in other positions may be present. As noted previously in the reaction, the double bond will remain intact and the resultant addition of the aliphatic olefin to the cyclopentene will occur on one of the single bond or saturated carbon atoms in the ring structure. Aside from the chlorinated derivatives, there may also be employed the comparable bromine and iodine derivatives so that the term "halogen" is intended to include all three.

As the aliphatic olefinic reactant, there may be employed an olefin having from 2 to 20, preferably 2–8, carbon atoms per molecule including both the normal and isomeric structures. Examples of these olefins are ethylene, propylene, butylene, isobutylene, etc., up to $C_{20}$ and the various isomers.

As the catalyst there may be employed any of the conventional well-known Friedel-Crafts type catalysts which include $FeCl_3$, $BCl_3$, $AlCl_3$, $AlBr_3$, $BF_3$ and the like. The catalyst is employed in an amount from 0.05 to 10 wt. percent and preferably in the ratio of .1 to 5 wt. percent based on total feed. If it is desired, conventional inert diluents such as heptane, hexane and carbon tetrachloride may be employed.

The reaction may be carried out at atmospheric to super-atmospheric temperatures as desired. In the case of a light olefin such as ethylene or propylene, it may in some cases be preferable to employ sufficient pressure to maintain the olefin in liquid phase although the reaction proceeds well under conditions in which the light olefin would normally be gaseous. Pressures as high as 1500 p.s.i.g. may be employed. The reaction proceeds rapidly at temperatures of from —50° to 100° C.; however, they are preferably maintained between —15° C. and +10° C.

The ratio of aliphatic olefin to halogenated cyclopentene may be varied considerably from, for example, stoichiometric amounts to preferably large excesses of the aliphatic olefin such as 2 to 10 moles or higher of aliphatic olefin per mole of halocyclopentene. In a batchwise operation the halogenated cyclopentene is added to the aliphatic olefin slowly for ease in controlling the temperature, the reaction being highly exothermic. Continuous stirring during the addition and subsequent reaction is preferable.

The process aforedescribed may easily be adapted to either a batch, semicontinuous or continuous operation by conventional engineering skills.

For a more complete understanding of this invention, reference is now had to the following equation which depicts the reaction mechanism involved.

(1)

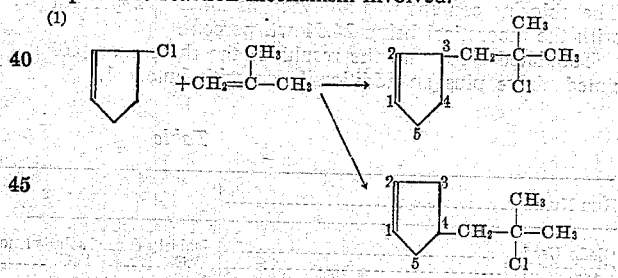

With this particular reaction wherein two isomers are formed, the 3-(2-chloro-2-methyl propyl) cyclopentene predominates over the 4-substituted isomer.

A further equation showing the reaction mechanism follows:

(2)

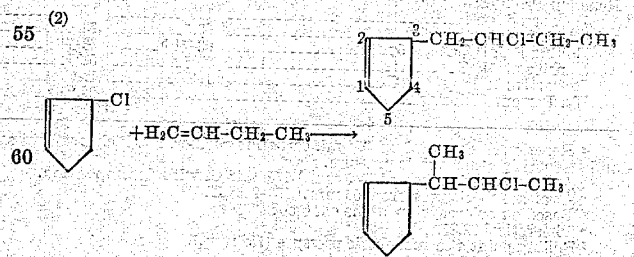

The cloro-alkyl radical may also be positioned on the 4 carbon atom.

Reference is now had to the following examples which demonstrate the reaction and product obtained.

EXAMPLE 1

Into a flask there were charged 181 grams of isobutylene with one gram of $FeCl_3$ and the mixture was cooled to −15° to 0° C. 142.5 grams of chlorocyclopentene were added with stirring over a period of 60 minutes with the temperature being maintained between −15° and 0° C. After complete addition of the chlorocyclopentene, the product was distilled under vacuum at 15 mm. mercury to recover 140 grams of the cyclopentenyl chlorobutane (a yield of 63.5 mole percent based on chlorocyclopentene charged). The product had a density of 0.95 at 20° C. and a refractive index of 1.470, also at 20° C. This product was identified as a mixture of the two isomers set forth in Equation 1 above.

EXAMPLE 2

The experiment of Example 1 was repeated employing 360 grams of isobutylene and 124 grams of chlorocyclopentene at about −5° C. Distillation was again carried out at 15 mm. mercury to obtain 140 grams of product or a 73 mole percent yield based on chlorocyclopentene charged. The boiling point, as in Example 1, was between 63° and 71° C. at 15 mm. mercury, the spread being accounted for by the presence of two isomers. The density was 0.95 at 20° C. and the refractive index 1.469 at the same temperature. The chlorine content was analyzed at 22.25 wt. percent as compared with a theoretical chlorine content of 22.35 wt. percent.

EXAMPLE 3

Example 1 was repeated employing propylene as the olefin at atmospheric pressures. For this example, 300 ml. of carbon tetrachloride were added to the reaction flask and the solvent was maintained saturated with propylene at 0° C. and atmospheric pressure. To this mixture 124 grams of chlorocyclopentene were added with 1% FeCl₃ catalyst being present. Reaction temperature was at 0° C. and the addition rate over a period of 60 minutes. 17.5 grams of product were recovered for a 10 mole percent yield. Boiling point of the product at atmospheric pressure was 170–172° C., with a density of 0.96 and refractive index of 1.464, both at 20° C. The chlorine content was analyzed as 24.25 wt. percent with the theoretical being 24.51 wt. percent.

Tabulated below are the results of the three examples noted above plus an additional run with butene-1.

under sufficient pressure to maintain the propylene in liquid phase and in desired concentrations. A comparison of Runs 1 and 2 in the table show that the yields may be increased by operating with large excesses of aliphatic olefin. Run No. 1 employed an aliphatic olefin to chlorocyclopentene ratio of 2.3, whereas in Run No. 2 this ratio was 5.3.

The cyclopentenyl halo-alkanes of this invention are primarily useful for making many new and useful derivatives. As an example, the cyclopentenyl chloro-isobutane is readily oxidized to 2-hydroxy-isobutyl glutaric acid gamma lactone as represented by the following equation:

(3) 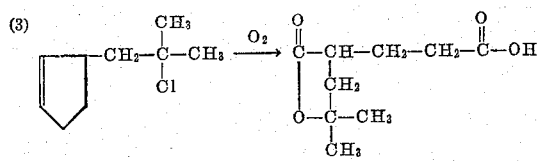

This oxidation was carried out by employing a 7.5 wt. percent aqueous potassium permanganate solution as the oxidizing agent. A 25% yield of the 2-hydroxy-isobutyl glutaric acid gamma lactone was obtained. This lactone is especially useful for making polyester resins for preparing glass fiber laminates. Also, the novel compounds of this invention may be dehydrochlorinated to produce novel types of nonconjugated dienes, e.g., an alkenyl cyclopentene.

EXAMPLE 4

The cyclopentenyl chloro-alkane obtained from Run 1 in the table was heated to 160–180° C. with anhydrous sodium acetate. There was obtained a mixture of the following nonconjugated dienes: 1-isobutylene-3-cyclopentene and 2-isobutylene-3-cyclopentene, as the major products. The product mixture from this dehydrochlorination boiled at 146°–148° C. with a density of 0.82 at 20° C. and a refractive index at 20° C. of 1.460. These dienes may be employed in the manufacture of resins by conventional polymerization techniques or they may be employed as additives to the polymerization of olefins such as isobutylene for the preparation of resins and rubbery materials suitable for making tires and the like.

*Table*

| Run Number | 1 | 2 | 3 | 4 |
|---|---|---|---|---|
| Olefin Used | Isobutylene | Isobutylene | Butene-1 | Propylene. |
| Catalyst Used | FeCl₃ | FeCl₃ | FeCl₃ | FeCl₃. |
| Charge, gm.: | | | | (ᵃ). |
| Olefin | 181 | 360 | 360 | 124. |
| Chlorocyclopentene | 142.5 | 124 | 124 | 1. |
| Catalyst | 1.0 | 1.0 | 2.0 | |
| Reaction Conditions: | | | | |
| Temperature, °C | −15° to 0° | −5° | −5° to +5° | 0°. |
| Time Used to Add Chlorocyclopentene, min. | 60 | 60 | 60 | 60. |
| Reaction Product: | | | | |
| Recovered, gm | 140 | 140 | 85 | 17.5. |
| Yield, mole percent ᵈ | 63.5 | 73 | 44.5 | 10. |
| Boiling Point, °C. @ 15 mm | 63–71 ᵇ | 63–71 ᵇ | 78–87 ᶜ | 170–172.ᶠ |
| Density at 20° C | 0.95 | 0.95 | 0.97 | 0.96. |
| Refractive Index at 20° C | 1.470 | 1.469 | 1.473 | 1.464. |
| Wt. Percent Chlorine | | 22.25 ᵉ | 22.29 ᵉ | 24.25.ᵍ |

ᵃ Reaction flask contained 300 ml. carbon tetrachloride which was kept saturated with propylene at 0° C. and essentially atmospheric pressure.
ᵇ At atmospheric pressure (765 mm.) 175–184° C. with decomposition.
ᶜ At atmospheric pressure (765 mm.) 190–205° C.
ᵈ Based on chlorocyclopentene charged.
ᵉ Theoretical 22.35.
ᶠ Boiling point at atmospheric pressure (762 mm.).
ᵍ Theoretical 24.61.

The data in this table show that with isobutylene as high as 73% cyclopentenyl chloroalkanes can be obtained under the conditions shown. The low yield obtained in the propylene run was due primarily to the low concentration of propylene maintained in the reaction flask. Increased yields may be obtained by operating To make this copolymer, 5% of the isobutenyl cyclopentene was mixed with 95% isobutylene and reacted with .05% AlCl₃ at about −80° C. for five minutes. Conversion was 80% and the product worked up as conventional in butyl manufacture. From 1–20% of the isobutenyl cyclopentene may be employed.

What is claimed is:

1. A process for preparing a halo-alkyl substituted cyclopentene which comprises reacting an olefinic hydrocarbon with a halocyclopentene in the presence of a Friedel-Crafts type catalyst.

2. A process in accordance with claim 1 wherein the olefinic hydrocarbon contains from 3 to 20 carbon atoms and is present in an amount from at least 2 moles per mole of halocyclopentene.

3. A process for preparing a cyclopentenyl chloroalkane which comprises reacting a chlorocyclopentene with an olefin having from 3 to 20 carbon atoms at a temperature between $-50°$ C. and $100°$ C. in the presence of a Friedel-Crafts type catalyst.

4. A process in accordance with claim 1 wherein said catalyst is $FeCl_3$.

5. A process in accordance with claim 1 wherein said catalyst is employed in an amount in the range of 0.05 to 10 wt. percent based on total feed to reaction.

6. A process in accordance with claim 3 wherein said catalyst is $FeCl_3$ and employed in an amount in the range of 0.05 to 10 wt. percent based on total feed to reaction.

7. A process for preparing a cyclopentenyl chloroalkane which comprises adding 1 mole of chlorocyclopentene to 2 to 10 moles of an aliphatic monoolefin having 3 to 4 carbon atoms per molecule at a temperature between $-15°$ and $+10°$ C. in the presence of 0.1 to 5 weight percent of iron trichloride based on total feed, and recovering cyclopentenyl chloroalkane product from the resulting mixture.

8. A compound having the structural formula

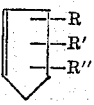

where R is a $C_3$ to $C_{20}$ mono-halogen substituted alkyl radical wherein the halogen substituent is attached to a carbon atom other than a primary carbon atom, and R' and R" are selected from the group consisting of hydrogen and $C_1$–$C_3$ alkyl radicals.

9. 3(2 methyl-2-chloro-propyl)-cyclopentene.
10. 4(2 methyl-2-chloro-propyl)-cyclopentene.
11. 3(2-chlorobutyl)-cyclopentene.

References Cited in the file of this patent

UNITED STATES PATENTS

| | | |
|---|---|---|
| 2,342,072 | Bailey et al. | Feb. 15, 1944 |
| 2,436,490 | Schmerling | Feb. 24, 1948 |
| 2,567,918 | Burroughs | Sept. 18, 1951 |
| 2,601,075 | Winklatz | June 17, 1952 |
| 2,629,710 | McBurney | Feb. 24, 1953 |
| 2,683,754 | Kennedy et al. | July 13, 1954 |

OTHER REFERENCES

Robinson et al.: Jour. Chem. Soc., 1935, 1414–16.
Burschkies et al.: Chem. Ber., 82, 224–6, (1949).
Barber et al.: Jour. Am. Chem. Soc., 73, 746–9 (1951).
Stefanovic et al.: Rec. Trav. Chem., 73, 401–9 (1954).
Toldy et al.: Chem. Abstracts, 50, 363c (1956).